United States Patent
Zhang et al.

(10) Patent No.: US 11,916,620 B2
(45) Date of Patent: Feb. 27, 2024

(54) ENHANCED UPLINK BEAM SELECTION FOR MASSIVE MIMO SYSTEM

(71) Applicant: Nokia Technologies Oy, Espoo (FI)

(72) Inventors: Yi Zhang, Beijing (CN); Deshan Miao, Beijing (CN); Yuantao Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 405 days.

(21) Appl. No.: 16/310,072

(22) PCT Filed: Jun. 17, 2016

(86) PCT No.: PCT/CN2016/086153
§ 371 (c)(1),
(2) Date: Dec. 14, 2018

(87) PCT Pub. No.: WO2017/214969
PCT Pub. Date: Dec. 21, 2017

(65) Prior Publication Data
US 2019/0253108 A1 Aug. 15, 2019

(51) Int. Cl.
*H04B 7/0404* (2017.01)
*H04B 7/0417* (2017.01)
(Continued)

(52) U.S. Cl.
CPC ........ *H04B 7/0404* (2013.01); *H04B 7/0413* (2013.01); *H04B 7/0417* (2013.01);
(Continued)

(58) Field of Classification Search
CPC .. H04B 7/0413; H04B 7/0695; H04B 7/0404; H04B 7/063; H04B 7/088; H04B 7/0417; H04L 5/0053; H04L 5/0023; H04W 16/28
See application file for complete search history.

(56) References Cited

U.S. PATENT DOCUMENTS

| 6,882,637 | B1 * | 4/2005 | Le | H04L 1/0082 |
| | | | | 341/60 |
| 9,351,288 | B2 * | 5/2016 | Pi | H04W 72/0413 |

(Continued)

FOREIGN PATENT DOCUMENTS

| CN | 1656826 A | 8/2005 |
| CN | 101472346 A | 7/2009 |

(Continued)

OTHER PUBLICATIONS

Sesia et al., "LTE—The UMTS Long Term Evolution: From Theory to Practice", Second Edition, Wiley Publication, 2011, 43 pages.
(Continued)

*Primary Examiner* — Aristocratis Fotakis
(74) *Attorney, Agent, or Firm* — Joseph C. Drish; Harrington & Smith (57) ABSTRACT

A radio network sends downlink signaling to a user equipment (UE) that triggers an enhanced uplink beam selection protocol, based on quality of the UE's uplink signaling the network receives according to a basic uplink beam selection protocol. In response the UE transmits pre-defined signaling such as uplink beam references signals (U-BRS) with uplink beams according to the downlink signaling. The network measures and selects one or more of those uplink beams for the UE to use for sending uplink data, and notifies this selection to the UE. In various embodiments the basic uplink beam selection protocol is based on uplink-downlink reciprocity, the downlink triggering signaling is dynamic and further selects a subset of uplink beams, and multiple UEs can be triggered in common signaling where blind decoding by the UEs is enabled via a scrambling ID for this enhanced uplink beam selection protocol purpose.

22 Claims, 6 Drawing Sheets

(51) Int. Cl.
  *H04B 7/06* (2006.01)
  *H04B 7/08* (2006.01)
  *H04B 7/0413* (2017.01)
  *H04L 5/00* (2006.01)
  *H04W 16/28* (2009.01)

(52) U.S. Cl.
  CPC .......... *H04B 7/0695* (2013.01); *H04B 7/088* (2013.01); *H04L 5/0023* (2013.01); *H04L 5/0053* (2013.01); *H04W 16/28* (2013.01)

(56) References Cited

U.S. PATENT DOCUMENTS

| | | | |
|---|---|---|---|
| 9,973,849 B1* | 5/2018 | Zhang | H04R 3/005 |
| 2007/0054700 A1 | 3/2007 | Hovers et al. | |
| 2013/0039345 A1* | 2/2013 | Kim | H04W 72/042 370/332 |
| 2013/0040684 A1* | 2/2013 | Yu | H04B 7/0617 455/517 |
| 2013/0083774 A1* | 4/2013 | Son | H04W 36/0058 370/331 |
| 2013/0201938 A1 | 8/2013 | Seol et al. | |
| 2013/0258885 A1* | 10/2013 | Yu | H04L 1/188 370/252 |
| 2013/0322280 A1 | 12/2013 | Pi | 370/252 |
| 2014/0314007 A1* | 10/2014 | Chen | H04B 7/00 370/329 |
| 2014/0323143 A1* | 10/2014 | Jung | H04L 5/0025 455/452.1 |
| 2015/0009984 A1 | 1/2015 | Jung et al. | |
| 2016/0099763 A1 | 4/2016 | Chen | |
| 2016/0150435 A1 | 5/2016 | Baek et al. | |
| 2016/0197659 A1* | 7/2016 | Yu | H04W 16/28 370/335 |
| 2016/0373180 A1* | 12/2016 | Guo | H04B 7/063 |
| 2017/0026102 A1* | 1/2017 | Guo | H04B 7/063 |
| 2017/0273092 A1* | 9/2017 | Nabetani | H04B 7/0452 |
| 2017/0295537 A1* | 10/2017 | Wang | H04W 48/20 |
| 2018/0219604 A1* | 8/2018 | Lu | H04L 1/1607 |
| 2019/0007122 A1* | 1/2019 | Furuskog | H04B 7/0695 |
| 2019/0104549 A1* | 4/2019 | Deng | H04B 7/0617 |

FOREIGN PATENT DOCUMENTS

| | | |
|---|---|---|
| CN | 103875190 A | 6/2014 |
| CN | 105144621 A | 12/2015 |
| CN | 105308881 A | 2/2016 |
| CN | 105409312 A | 3/2016 |
| IN | 105122662 A | 12/2015 |
| WO | 2013/022292 A2 | 2/2013 |
| WO | 2015/080645 A1 | 6/2015 |
| WO | WO-2015140838 A1 | 9/2015 |

OTHER PUBLICATIONS

Nsenga et al., "Joint Transmit and Receive Analog Beamforming in 60 Ghz MIMO Multipath Channels", IEEE International Conference on Communications, Jun. 14-18, 2009, 5 pages.

Alkhateeb et al., "Channel Estimation and Hybrid Precoding for Millimeter Wave Cellular Systems", IEEE Journal of Selected Topics in Signal Processing, vol. 8, No. 5, Oct. 2014, pp. 831-846.

"3rd Generation Partnership Project; Technical Specification Group Radio Access Network; Evolved Universal Terrestrial Radio Access (E-UTRA); Physical layer procedures (Release 13)", 3GPP TS 36.213, V13.1.1, Mar. 2016, pp. 1-361.

"3rd Generation Partnership Project; Technical Specification Group Radio Access Network; Evolved Universal Terrestrial Radio Access (E-UTRA); Physical channels and modulation (Release 13)", 3GPP TS 36.211, V13.1.0, Mar. 2016, pp. 1-155.

International Search Report and Written Opinion received for corresponding Patent Cooperation Treaty Application No. PCT/CN2016/086153, dated Feb. 28, 2017, 11 pages.

"Mobility Using Uplink Measurements", 3GPP TSG-RAN Working Group 2 meeting #94, R2-163939, Agenda: 9.5.1, Sony, May 23-27, 2016, 2 pages.

"Use Cases and RAN2 Issues of Beam Tracking In a Beamforming Based High Frequency NR", 3GPP TSG-RAN Working Group 2 meeting #94, R2-163730, Agenda: 9.5.1, Samsung, May 23-27, 2016, 5 pages.

"Beam-Based Design Framework for New Radio", 3GPP TSG-RAN Working Group 1 meeting #85, R1-164874, Agenda: 7.1.6, InterDigital Communications, May 23-27, 2016, pp. 1-5.

Extended European Search Report received for corresponding European Patent Application No. 16905084.6, dated Dec. 9, 2019, 11 pages.

* cited by examiner

ENHANCED UPLINK BEAM SELECTION FOR MASSIVE MIMO SYSTEM

RELATED APPLICATION

This application was originally filed as Patent Cooperation Treaty Application No. PCT/CN2016/086153 filed Jun. 17, 2016.

TECHNOLOGICAL FIELD

The described invention relates to wireless communications, and more particularly to the establishment of a wireless connection between a user device (UD) and a radio access network characterized by a lack of robustness such as observed in line-of-sight (LOS) type radio communication characteristics. These characteristics are prevalent for millimeter-wave (mmWave) spectrum for which 5G radio access technology (RAT) is being developed.

BACKGROUND

Wireless radio access technologies continue to be improved to handle increased data volumes and larger numbers of subscribers. The 3GPP organization is developing $5^{th}$ Generation (5G) wireless networks to handle peak data rates of the order of ~10 Gbps (gigabits per second) while still satisfying ultra-low latency requirements in existence for certain 4G applications. 5G intends to utilize radio spectrum on the order of GHz or more in the millimeter-wave (mmWave) band; and also to support massive MIMO (m-MIMO). M-MIMO systems are characterized by a much larger number of antennas as compared to 4G systems, as well as finer beamforming and a higher antenna gain.

One current area of discussion within certain 3GPP groups working on 5G systems if beamforming at the user equipment (UE) side. For many years it has not been uncommon for UEs to have multiple antennas of their own but exploiting the UE's MIMO capabilities has been somewhat less robust as compared to exploiting the potential of MIMO at the network side. For example, in the 4G/LTE system multiple beams can be transmitted at the network's/base station's side with an active antenna system (AAS). Based on beamformed downlink reference signalling the UE can make beam-specific measurements and feed back to the network the index of what the UE sees as the best downlink beam. But at the UE side there are far fewer antennas (typically 2 or 4) and the UE's small physical size is a practical restriction to the size of those few UE-side antennas. However, at UE's side, small number of antenna is used with size restriction. For these reasons the beamforming techniques that have been explored and found useful at the network's side are generally not considered analogous for deployment at the UE side.

But the very high frequency bands (for example, even above 6 GHz), 5G systems should provide a radio environment where UE-side beamforming can significantly improve the link budget. This is the area to which these teachings are directed, though the general principles are not limited specifically to 5G systems nor even to GHz-level radio environments.

The following references provide some relevant background materials:
LTE: the UMTS Long Term Evolution from Theory to Practice (2d Ed.; John Wiley & Sons, Ltd.; 2011), chapters 11 and 29 (last visited Jun. 8, 2016—available at http://www.aldraji.com/download/The_UMTS_Long_Term_EvolutionB.pdf;).
J. Nsenga, et.al., "Joint Transmit and Receive Analog Beamforming in 60 GHz MIMO multipath channels", in IEEE Proc. ICC, June 2009.
Ahmed Alkhateeb, et.al., "Channel Estimation and Hybrid Precoding for Millimeter Wave Cellular System", in IEEE Journal of Selected Topics in Signal Processing, vol. 8, no. 5, pp. 831-846, October 2014.
3GPP TS 36.213 v13.1.1 (2016-03) E-UTRA Physical layer procedures, section 5.

SUMMARY

In a first embodiment of these teachings there is a method comprising: based on quality of uplink signaling received from a user equipment (UE) according to a basic uplink beam selection protocol, sending downlink signaling to the UE that triggers an enhanced uplink beam selection protocol; receiving pre-defined signaling with uplink beams from the UE according to the downlink signaling; selecting one or more of the uplink beams for the UE to use for sending uplink data; and notifying the UE of the selection.

In a second embodiment of these teachings there is a computer readable memory tangibly storing a computer program that when executed by one or more processors causes a host radio access node device to: based on quality of uplink signaling received from a user equipment (UE) according to a basic uplink beam selection protocol, send downlink signaling to the UE that triggers an enhanced uplink beam selection protocol; receive pre-defined signaling with uplink beams from the UE according to the downlink signaling; select one or more of the uplink beams for the UE to use for sending uplink data; and notify the UE of the selection.

In a third embodiment of these teachings there is an apparatus comprising at least one processor and at least one memory storing a computer program. In this embodiment the at least one processor is configured with the at least one memory and the computer program to cause the apparatus to at least: based on quality of uplink signaling received from a user equipment (UE) according to a basic uplink beam selection protocol, send downlink signaling to the UE that triggers an enhanced uplink beam selection protocol; receive pre-defined signaling with uplink beams from the UE according to the downlink signaling; select one or more of the uplink beams for the UE to use for sending uplink data; and notify the UE of the selection.

In a fourth embodiment of these teachings there is a method comprising: in response to receiving downlink triggering signaling, transmitting pre-defined uplink signaling with uplink beams according to the downlink triggering signaling; receiving a reply to the pre-defined uplink signaling that identifies one or more of the uplink beams; and thereafter sending uplink data on the identified one or more uplink beams.

In a fifth embodiment of these teachings there is a computer readable memory tangibly storing a computer program that when executed causes a host user equipment to: in response to receiving downlink triggering signaling, transmit pre-defined uplink signaling with uplink beams according to the downlink triggering signaling; receive a reply to the pre-defined uplink signaling that identifies one or more of the uplink beams; and thereafter send uplink data on the identified one or more uplink beams.

In a sixth embodiment of these teachings there is an apparatus comprising at least one processor and at least one memory storing a computer program. In this embodiment the at least one processor is configured with the at least one memory and the computer program to cause the apparatus to at least: in response to receiving downlink triggering signaling, transmit pre-defined uplink signaling with uplink beams according to the downlink triggering signaling; receive a reply to the pre-defined uplink signaling that identifies one or more of the uplink beams; and thereafter send uplink data on the identified one or more uplink beams.

In a seventh embodiment of these teachings there is an apparatus comprising means for sending, means for receiving, means for selecting and means for notifying. The means for sending is for sending downlink signaling to a user equipment (UE) that triggers an enhanced uplink beam selection protocol based on quality of uplink signaling that is received from the UE according to a basic uplink beam selection protocol. The means for receiving is for receiving pre-defined signaling with uplink beams from the UE according to the downlink signaling. The means for selecting is for selecting one or more of the uplink beams for the UE to use for sending uplink data, and the means for notifying is for notifying the UE of the selection. In a specific non-limiting embodiment the means for sending and the means for receiving comprise respective transmitter and receiver of a radio in combination with one or more processors and enabling software stored on a local memory; the means for selecting include the one or more processors with software and memory, and the means for notifying includes the transmitter.

In an eighth embodiment of these teachings there is an apparatus comprising: means for transmitting, means for receiving and means for sending. The means for transmitting is for transmitting pre-defined uplink signaling with uplink beams according to downlink triggering signaling in response to receiving said downlink triggering signaling. The means for receiving is for receiving a reply to the pre-defined uplink signaling that identifies one or more of the uplink beams. The means for sending is for sending uplink data, after the reply is received, on the identified one or more uplink beams. In a specific non-limiting embodiment the means for transmitting and the means for sending comprise a transmitter of a radio in combination with one or more processors and enabling software stored on a local memory; and the means for receiving include a receiver of a radio and the one or more processors with software and memory.

These aspects and others are detailed further below with particularity.

DETAILED DESCRIPTION

Example embodiments of these teachings provide a fast and accurate uplink beam selection scheme. As will be further detailed below, in one embodiment the UE sends an uplink beam reference signal (U-BRS) upon being triggered to do so by the network. This U-BSRS assists the network in choosing an uplink beam, for example when conventional uplink beam selection techniques such as those based on reciprocity with the selected downlink beam are not suitable. This enables the network to make an enhanced beam selection, based on measurement of the U-BSRS it triggered the UE to send. Example triggering and signaling mechanisms are discussed in detail below.

In general, the discussion below assumes the uplink beam is selected for the purpose of transmitting data since that is generally where the most substantial improvements to the overall link budget will become manifest, but these techniques can also be used for selecting beams on which to transmit control information from the UE to the network. In practice it is expected the uplink beams used for control channels will simply re-use the uplink beams selected for transmitting data. Further, some of the examples below are in the context of selecting an uplink beam but these same techniques can be used to select two or more uplink beams from among the larger set of all possible uplink beams the given UE is capable of transmitting.

The concept of reciprocity for selection of the uplink beam is briefly summarized for background purposes. In the downlink direction it is known to use a beam specific reference signal in the process of selecting the appropriate downlink beam. For example, a Channel State Information Reference Signal (CSI-RS), or a Secondary Synchronization Signal (SSS) can be used to measure downlink quality of different beams and one or more downlink beams can be selected by comparing those measurements against one another and/or against some threshold value. The concept of beam reciprocity assumes that the similarities between the downlink and uplink channel are pervasive enough that the downlink beam on which the UE receives its downlink data from the network can be used as the basis to choose the uplink beam for transmitting uplink data. Because the downlink beam is selected based on some qualitative and quantitative basis such as the CSI-RS or SSS examples above, the assumed correspondence between uplink and downlink extends that downlink analysis as being valid also for the uplink.

Figure 1:
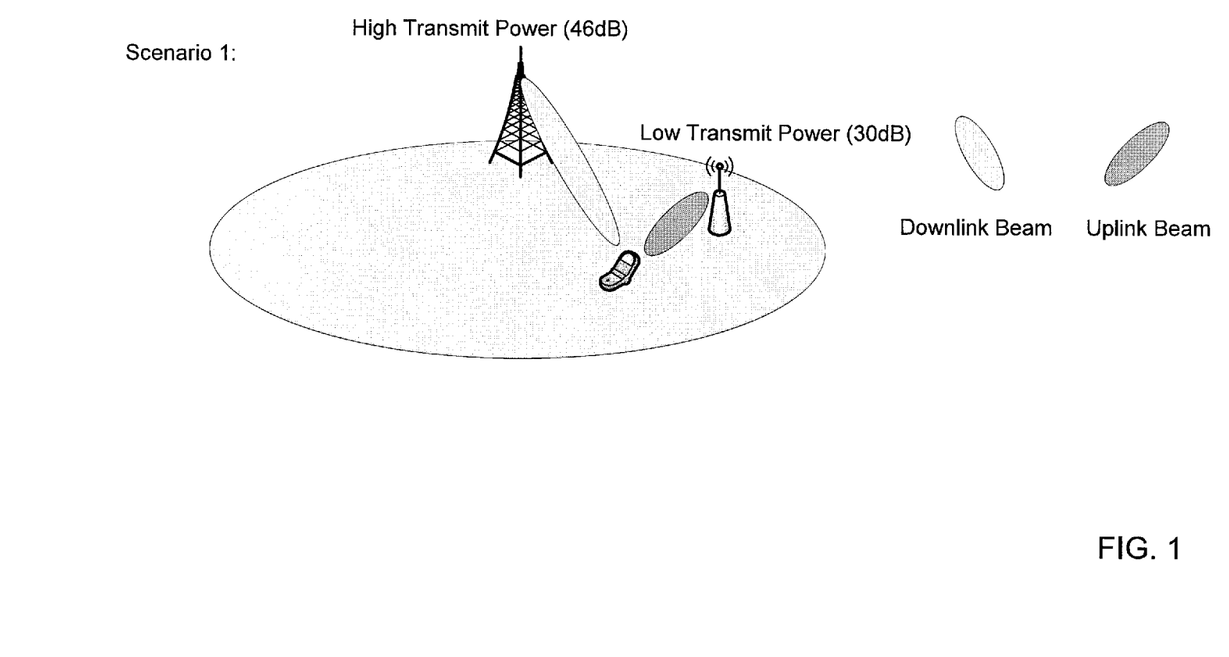
FIG. 1 is a conceptual diagram illustrating uplink and downlink beams in one particular radio environment in which embodiments of these teachings may be deployed to improve the link budget.

However, this assumption of uplink correspondence with the downlink may be not valid in some scenarios. FIG. 1 illustrates one such example for which the salient point is that there are different downlink transmission powers in use for the different transmission points. The FIG. 1 example has a macro eNB sending downlink data to a UE but that same UE sends its uplink data to an associated micro/pico eNB. The radio environment of FIG. 1 is becoming increasingly common in LTE-A deployments where the macro eNB and micro/pico eNBs operate in such cooperation that all data to and from the UE is routed through the macro eNB which has a network interface with the micro/pico eNB and connects the micro/pico eNB to the core network via that network interface. In the radio environment of FIG. 1 the downlink and uplink vary greatly in both transmit power and distance between transmitter and receiver. Clearly it is not a valid assumption for beam selection purposes that the downlink channel from the macro eNB will reasonably reflect the uplink channel to the micro/pico eNB.

Figure 2:
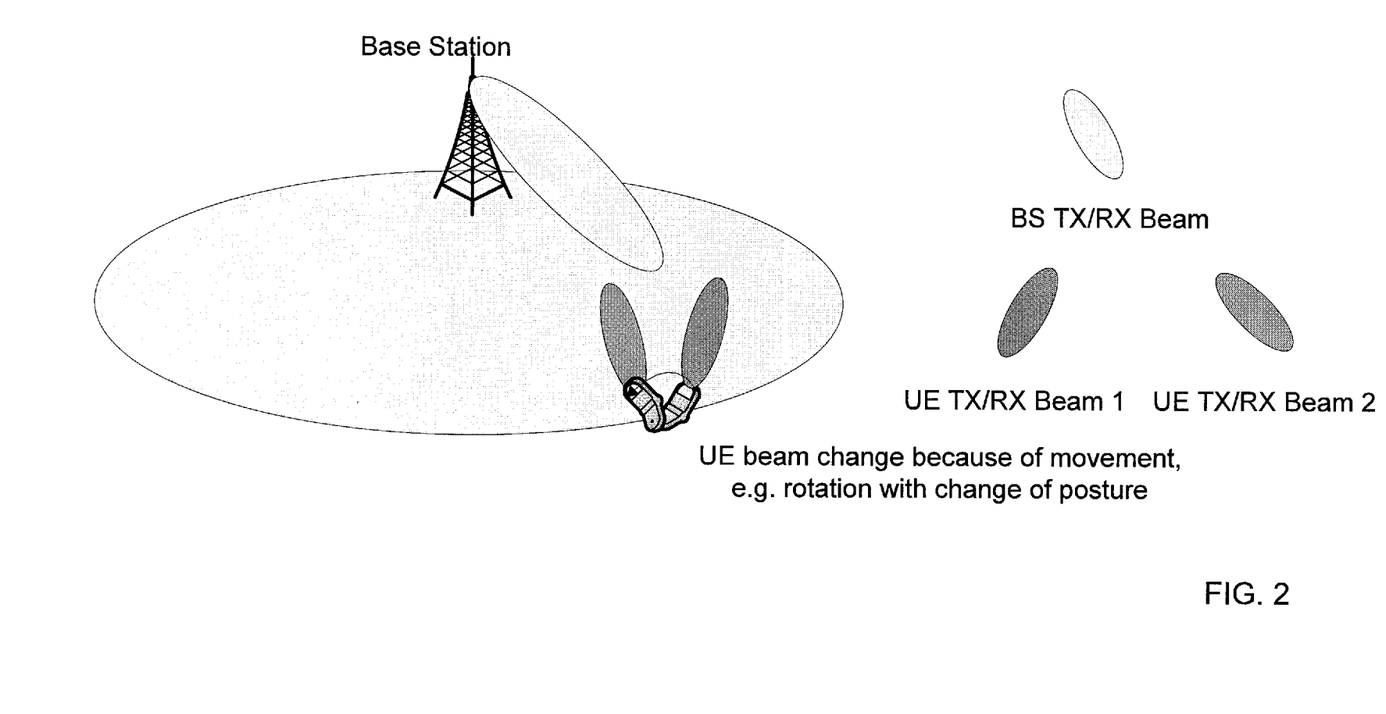
FIG. 2 is a conceptual diagram illustrating uplink and downlink beams in a radio environment different from FIG. 1 in which embodiments of these teachings may also be deployed to advantage.

FIG. 2 illustrates a different radio environment in which the link budget can be improved by deploying embodiments of these teachings. In FIG. 2 the transmit and receive beams from the perspective of the UE changes due to movement of the UE, even as little as a change in posture or hand position of the person holding the (handheld) UE. As shown the transmit/receive beam at the UE's 12 o'clock position is generally aligned with the base station in the illustrated UE TX/RX beam 2 position but that same 12 o'clock beam is not in the other UE TX/RX beam 1 position. In this case, at any given instant the downlink beam may be a suitable proxy for choosing the uplink beam but movement of the UE makes that downlink beam choice valid only until the UE moves again.

As a further consideration, the radio signal propagation characteristics in the 5G mmWave frequency regime are very different from more traditional cellular frequencies. Specifically, for 5G mmWave frequencies there is little reflectivity and the radio link is subject to environmental interferences to the point the radio link may be considered to be limited to line of sight. As such 5G systems are being developed to deploy a very large number of radio access points (APs) with the UE having connections with clusters of APs at any given time. Changing position of the UE slightly can shadow the handset's antennas from its line of sight link with one network access node/AP and force it to make active its connection with another node/AP in its cluster. Such an environment would be similar to that of FIG. 2 but with the UE's connection for the two illustrated positions being to different APs.

The radio environment is not the only concern for proper beam selection. For different UEs, either from different manufacturers or different models from a common manufacturer, the situation of beam change may be different in that different UE models may be more or less susceptible than their counterparts to breaking a minimum bit/block error rate due to poor beam selection. As can be seen from all of these examples it is difficult to exploit only the downlink reference signal to keep up with the change of uplink beam for all the UEs and all the different radio environments, particularly when one considers pragmatic limitations to the signalling overhead associated with sending downlink reference signals and reporting the uplink measurement results.

Embodiments of these teachings can be deployed as a stand-alone uplink beam selection protocol. But in the examples below this uplink beam selection protocol is explained as a supplement to the more conventional reciprocity techniques for selecting the uplink beam, to be deployed in those circumstances where reciprocity uplink beam selection techniques alone are determined to be unsuitable. Whether stand-alone or as a supplement to other uplink beam selection techniques, these teachings provide a technique for selecting the uplink beam or beams on which to send the UE's data that is both fast and accurate.

Figure 3:
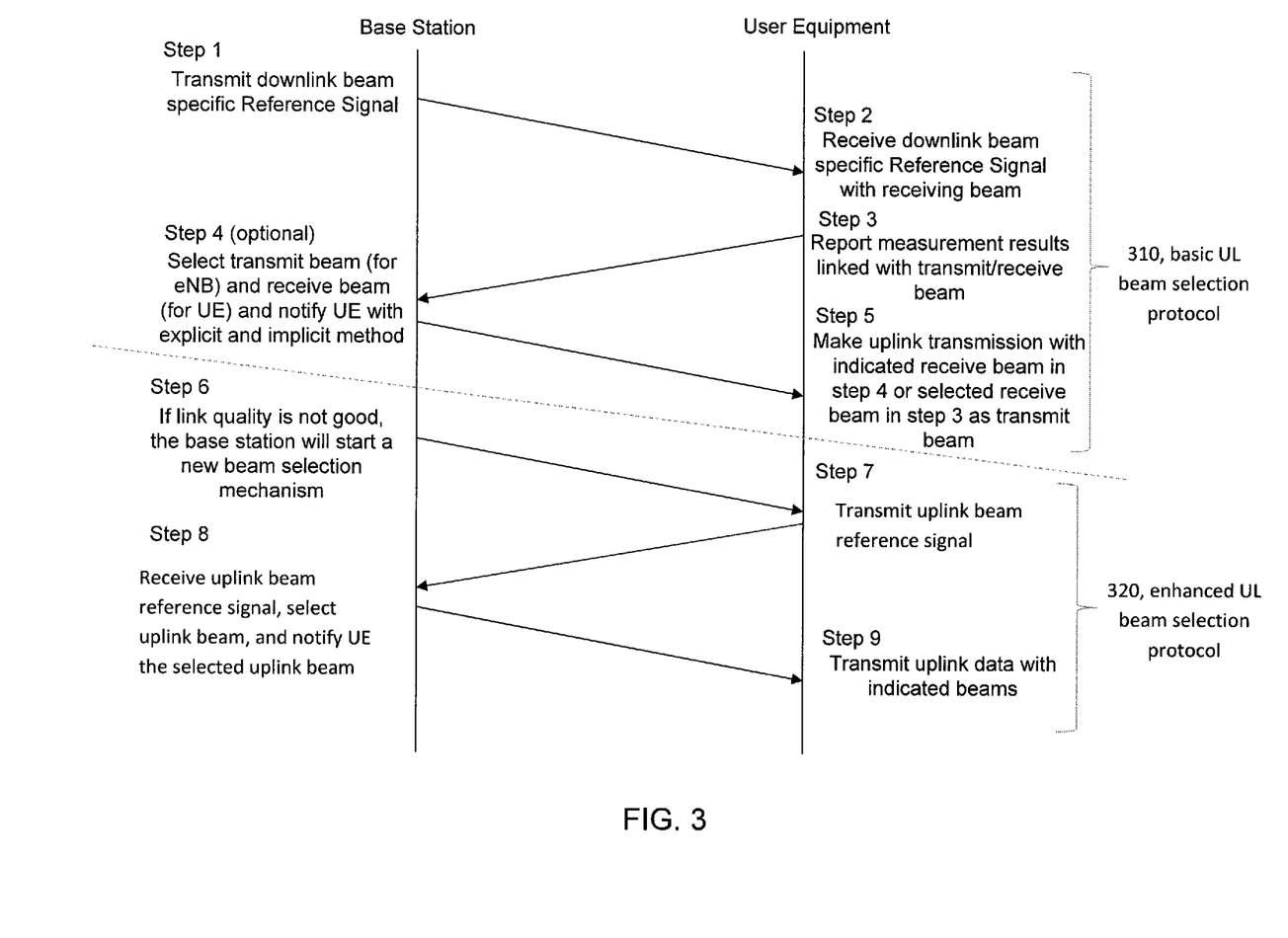
FIG. 3 is a signaling diagram between a base station and a user equipment illustrating an embodiment of the disclosed beam selection mechanism deployed for use when a reciprocity-based mechanism does not find a suitable uplink beam.

FIG. 3 illustrates signalling between the base station and the UE according to such an example. Steps 1 through 5 represent a basic uplink beam selection protocol 310 while steps 6 through 9 represent an enhanced uplink beam selection protocol 320 according to these teachings. In this example the basic uplink beam selection protocol 310 is a reciprocity technique that selects the uplink beam based on a quantitatively and qualitatively selected downlink beam, but this is not a limit to what can be used as the basic uplink beam selection protocol 310 and other known or yet to be developed techniques may be used in its place.

Further, while FIG. 3 is in the context of a single base station that does not imply a single transmission point; the base station may be transmitting or controlling transmissions from multiple physically diverse transmission points that may each define one or more transmission beams such as remote radio heads, micro/pico eNBs, APs and the like. These diverse transmission points can each define (with the relevant UE) one or more downlink beams at least but depending on the radio environment they may or may not also define one or more uplink beams with that UE; see FIG. 1 for an example of such a downlink/uplink disparity.

At step 1 of FIG. 3 the base station transmits a downlink beam-specific reference signal to the UE on multiple downlink beams, which the UE receives at step 2. The UE measures these at step 3, for example as reference signal received power RSRP and/or reference signal received quality RSRQ, and reports these measurement results to the base station. The measurement results denote the channel quality with a combination of transmit beam at the base station's side and receive beam at the UE's side. At step 4 the base station evaluates the reported measurement results, selects which downlink beam or beams are to be used going forward with this UE, and notifies the UE of the network's choice of downlink beam. The downlink beam or beams include transmit beam or beams at base station's side and receive beam or beams at UE's side. With this downlink beam choice, the UE at step 5 selects a corresponding uplink beam and transmits its next quantum of data to the base station on that selected uplink beam or beams.

In some variations of this basic beam selection protocol 310 the UE at step 3 evaluates its measurement results and makes the downlink beam selection itself. While this shifts the processing burden to the UE it reduces the signalling overhead by allowing the UE to signal only the index of the downlink beam it selected at step 3 rather than the results of its actual beam measurements. This also reduces the overhead signalling at step 4 since the UE does not need to be notified of the downlink beam selection. Regardless, typically for reciprocity beam selection techniques the uplink beam is chosen to correspond to the analytically chosen downlink beam, so for example if beam index #3 were chosen as the downlink beam at step 4 (or at step 3 if the UE makes the selection itself) then beam index #3 would be used for the uplink data transmissions at step 5. In general both the base station and UE use the same uplink beam selection algorithm so there is no need to signal which is to be the uplink beam when beam reciprocity techniques are in use.

Now at step 6 of FIG. 3 the base station determines that the link quality is not good and in response triggers the enhanced uplink beam selection protocol 320. Specific examples for how the network/base station signals the UE to trigger this protocol 320 are detailed further below with reference to a specific example at FIG. 4B.

There are several options by which the network might determine the link quality is not good at step 6, but regardless this determination means that the uplink beam that was selected according to the basic uplink beam selection protocol 310 is not suitable, or is no longer suitable if it was initially. It may be that the disparity between the downlink and uplink is so great that reciprocity does not select a suitable uplink beam at all, in which case step 6 will follow immediately after the UE sends its first batch of data at step 5 on the uplink beam that was put into use during that step of the basic protocol 310. Or it may be the uplink beam was suitable for a time but has since deteriorated.

The beam specific reference signals that the network transmits at step 1 are typically static and so if the base station sees deterioration on the downlink (for example, a higher number of negative acknowledgements from the UE) corresponding to deterioration on the uplink the base station may choose to re-run the basic protocol 310 once the next batch of CSI-RSs are scheduled for transmission (CSI-RS in LTE are sparsely transmitted at regular intervals from each physical and virtual antenna ports), or the measurement results based on SSS are triggered to report. In either of these cases the base station seeks to re-evaluate the downlink beam selection choice and the basic protocol 310 for reciprocity can find a new uplink beam to try.

But in response to seeing deterioration in the uplink the base station may instead choose to run the enhanced uplink beam selection protocol 320 as FIG. 3 depicts. In one example this may be due to the time delay until the base station's next scheduled CSI-RS transmission, in which case the base station might choose to trigger the enhanced protocol 320 even if there is deterioration in the downlink that corresponds to deterioration in the uplink. In another example the base station might see deterioration in the uplink but no deterioration in the downlink, meaning the selected downlink beam is not or is no longer a suitable proxy for selecting the uplink beam.

There are a variety of measurements the base station can use to make the determination at step 6 that link quality is not good. Many are well established in the wireless arts, for example: bit or block error rate (BER or BLER), relative signal strength (RSSI), signal to noise+interference ratio (SINR), and channel state (CSI) can all be used to measure quality of the uplink and determine therefrom whether the uplink has deteriorated to the point at which the base station should invoke the enhanced protocol 320.

Regardless of which specific measurement metric or metrics are used for the uplink assessment at step 6, the determination can look to the specific uplink beam in use in any number of ways. For example, if we consider the uplink beam chosen by the basic protocol 310 as the 'selected beam' that is evaluated for quality at step 6, then the base station can determine the link is poor enough to trigger the enhanced protocol 320 if any one or more of the following criteria are true, where in this case the candidate beams are any other uplink beams for which the UE can possibly use:
  The link quality for selected beam is below a threshold;
  The link quality of another candidate beam is higher than a threshold;
  The difference of link quality between selected beam and a candidate beam is less than a threshold;
  The difference of link quality between the selected beam and a candidate beam is less than an offset threshold, where the offset is determined based on the transmit power of the base station.

With that determination made, the base station completes step 6 of FIG. 3 by sending triggering bits (or one bit) to the UE to invoke the enhanced uplink beam selection protocol 320. Once triggered, the UE at step 7 transmits an uplink beam selection reference signal (U-BRS) on one or more beams which the network then measures and evaluates at step 8. From this measurement and evaluation the network/base station selects an uplink beam and notifies the UE of its choice via wireless signaling. In this regard the U-BRS according to these teachings is transmitted to assist the network's selection of the uplink beam. FIG. 3 closes with step 9 at which the UE transmits data to the network/base station on the selected beam (or beams) that were notified at step 8 and selected there by the base station according to the enhanced uplink beam selection protocol 320.

Figure 4A:
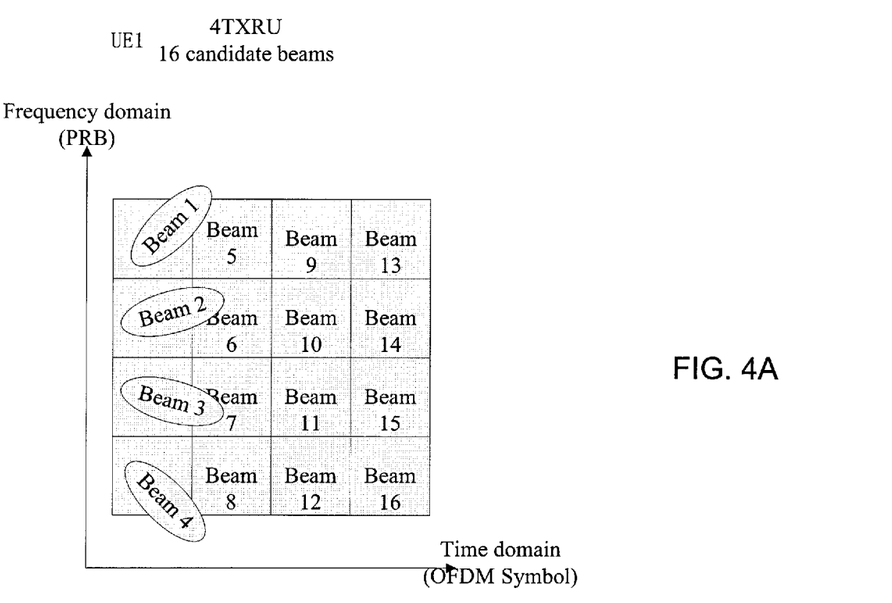
FIG. 4A is a table showing of mapping uplink beam reference signals (U-BRSs) to different combinations of resource block and OFDM symbols, according to one specific non-limiting example.

FIG. 4A is a table of radio frequency (as physical resource blocks PRBs) versus OFDM symbols and gives an example for U-BRS transmission for UEs with 16 candidate beams and 4 transmit-receive units (TXRUs). The resource elements within 4 PRBs and 4 OFDM symbols are used for this UE's U-BRS transmission. The U-BRS for different beams are preferably transmitted in orthogonal resources to better guarantee the measurement accuracy at the base station side. U-BRS transmission for different UE can be multiplexed by code division multiplexing (CDM), for example by cycling the shift of the base sequence. FIG. 4A is only an example and there is a variety of other resource mapping and multiplexing for U-BRS that can be used for deploying embodiments of these teachings. As will be seen in the FIG. 4B example below, in some instances for certain embodiments it may be that the UE transmits U-BRS on less than all of its possible beams.

Figure 4B:
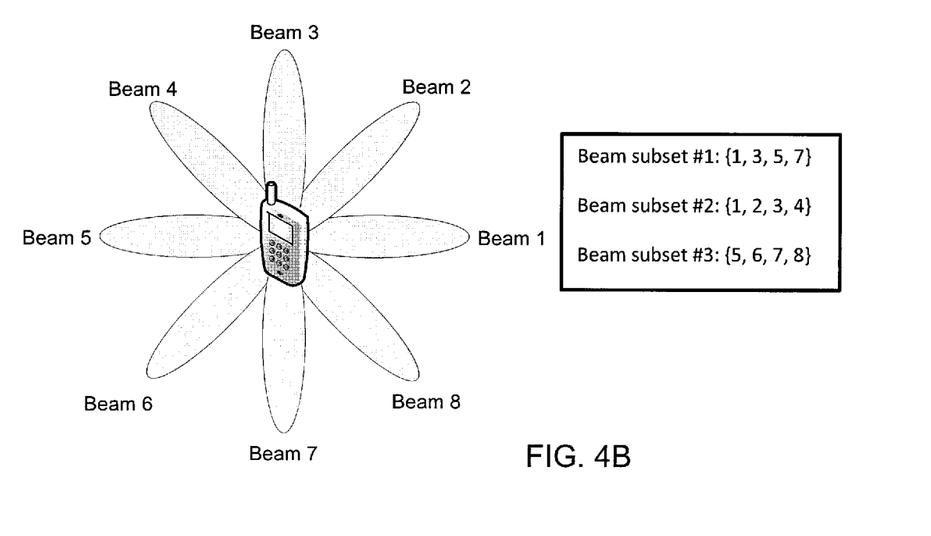
FIG. 4B illustrates 8 possible spatial beams of a UE and various subsets of them which may be identified when triggering the enhanced uplink beam selection protocol shown at FIG. 3, according to one specific embodiment.

To obtain fast uplink beam selection, dynamic triggering signalling can be used. That is, the triggering signalling at step 6 of FIG. 3 can be on an as-needed basis as opposed to the conventional CSI-RS on the downlink which is periodic and static. For the following assume that the 8 beams shown for the UE at FIG. 4B represent all of the possible UE beams for uplink data, though of course for other UEs what constitutes all the UE's possible uplink beams may be different. The network can know this information from the UE type or class, which will inform the network about the total number of transmit antennas for a particular UE. The beams on which the UE sends its U-BRS after being triggered to do so are considered as candidate beams for purposes of FIG. 4B.

In one instance it may be the network wants the UE to send its U-BRS on all of its possible beams. When all the candidate beams are required for measurement, the network can use 1-bit triggering signalling at step 6 of FIG. 3. 1-bit triggering signalling can also be used where embodiments of these teachings do not employ the beam subsets that FIG. 4B details by example in which case anytime the enhanced uplink beam selection protocol 320 is invoked the network will trigger it with 1-bit signalling and the UE will respond by sending its U-BRS on all of its possible uplink beams.

FIG. 4B details a more elegant solution which, as compared to the 1-bit signalling above, reduces overhead of U-BRS as well as latency of the network's beam selection by limiting the number of candidate beams on which the UE transmits its U-BRS. In this embodiment, all of the UE's possible uplink beams are divided into two or more subsets, and only the beams in selected subset are used by the UE to send its U-BRS. This subset will then represent all of the candidate beams for measurement by the network, and the U-BRS that are related to beams that are not in the chosen subset are not transmitted. For this embodiment there may be more triggering bits; for the example at FIG. 4B in which there are three distinct subsets a minimum of two bits can be used for the dual purpose of triggering the enhanced protocol 320 and indicating which beam subset is selected.

Table 1 below presents one example of the two-triggering bits for the three subsets defined at FIG. 4B. The value of the two bits can be considered an index to such a table, which is predefined for the base station and UE and stored in their respective local memories in advance of sending any triggering bits at step 6 of FIG. 3.

TABLE 1

Example triggering bit values for different subsets of uplink beams to send U-BRS

| Value of U-BRS triggering field | Description |
| --- | --- |
| '00' | No U-BRS trigger |
| '01' | U-BRS with the $1^{st}$ beam subset |
| '10' | U-BRS with the $2^{nd}$ beam subset(s) |
| '11' | U-BRS with the $3^{rd}$ beam subset(s) |

Alternatively, the value '00' can indicate a selection of all possible beams as shown in Table 2 below. In other embodiments there may be a larger number of subsets and a correspondingly larger number of triggering bits, and in other embodiments some triggering bits may select multiple otherwise-defined subsets (for example, bit values 000 and 001 are respective first and second subsets and bit value 011 selects both the first and second subsets). While any given beam can be listed in more than one subset, each subset is unique from each other subset and, with the possible exception of one subset, each subset includes less than all of the UE's possible beams. The division of beams into subsets can be flexible, for example the base station can send indices for each subset to the UE by higher layer signalling (for example radio resource control signalling). Or in another deployment the subsets may be fixed and pre-defined in a published standard that is specific for a given radio access technology.

TABLE 2

Example triggering bit values for different subsets of uplink beams to send U-BRS

| Value of U-BRS triggering field | Description |
| --- | --- |
| '00' | U-BRS with $1^{st}$ beam subset |
| '01' | U-BRS with the $2^{nd}$ beam subset(s) |
| '10' | U-BRS with the $3^{rd}$ beam subset(s) |
| '11' | U-BRS with the $4^{th}$ beam subset(s) |

Whether flexibly defined or fixed, it is advantageous to construct the subsets as follows. Firstly, to guarantee the robustness of beam selection, at least one beam subset should include multiple orthogonal beams with a large beam space between them. Another alternative is one beam subset should include all the possible uplink beams. Beam subset #1 of FIG. 4B is triggered by the signalling bits '01' in the above table and represents such a subset; each beam is orthogonal to each other beam and no two beams of this subset are spatially adjacent. Secondly, the beams in other subsets can be continuous with a small spatial space between them. Beam subsets #2 and #3 of FIG. 4B, triggered by the respective signalling bits '10' and '11' in the above table, reflect these principles in that in a given subset each beam is spatially adjacent to another beam such that all beams in such a subset form a spatially contiguous group of beams.

As wireless networks become more complex it is no longer enough to assume a single transmission point as the signaling diagram of FIG. 3 illustrates, and particularly as mentioned above for 5G mmWave radio access technologies with AP clusters serving a given UE. In this regard, for each spatially distinct transmission point for which a UE has an uplink connection, in one embodiment thee can be a single invocation of the enhanced protocol 320 and a single subset triggered for the UE and all the associated transmission points can make their measurements from the UE's transmission of U-BRS on the beams of that single subset, and then coordinate amongst themselves before signaling to the UE at step 8 of FIG. 3 which beam or beams are selected for the uplink.

In another embodiment each spatially distinct transmission point for which a UE has an uplink connection unilaterally determines to invoke or not invoke the enhanced protocol 320 and triggers the UE and identifies a beam subset without consideration of the other transmission points. In this case the UE would transmit on all the beams that are currently selected by any the various different transmission points.

Assuming again a single transmission point to more simply explain the following details, when the UE transmits its U-BRS on the beams indicated by the triggering signalling, the base station will receive these U-BRSs on all of the beams selected by that triggering signalling (all possible UE beams or the identified subset). This uplink transmission of U-BRS will have an impact on the network's reception of uplink transmissions from other UEs, since some receiving beams are not useful for the data transmission of other UEs. Further considering that there is more than one UE in the cell that may need to transmit U-BRS and it is clear this problem is not an occasional one once the above teachings are widely deployed. To address this interference issue, the U-BRSs from different UEs can be aggregated in time by multiplexing them all into one specific radio subframe.

Then, common triggering signalling will be a natural choice on account of multiplexing with data transmission of other UEs. Dynamic signalling format can refer to DCI format 3/3A. But, it needs a new scrambling ID for scrambling, e.g. uplink beam quality measurement scrambling ID, which is used for UE blind decoding. In this example, the triggering bits for all of the UEs that are triggered to send U-BRS are scrambled with their respective uplink beam quality measurement scrambling IDs and then multiplexed into one DCI format 3 and/or 3A that is itself scrambled with a radio network temporary identifier (RNTI) and signalled on the downlink, where this RNTI is specific for this new uplink beam selection function. The targeted UEs are able to decode the DCI using that RNTI and individually can then blindly decode their specific triggering bits by using the scrambling ID they were previously assigned. The specific position (position index) for any given UE's triggering bits that are multiplexed within that DCI can be pre-arranged with the network via RRC signalling so the UEs do not need to attempt to decode all the triggering bits for all the UEs that are multiplexed in that DCI.

Embodiments of these teachings offer certain technical advantages over the current state of the art. Specifically, the sending of uplink beam specific reference signals can be dynamically triggered, which is particularly advantageous when used to enhance the uplink beam selection that may have been made using reciprocity. Another advantage is that multiple bits can be used to both dynamically trigger the enhanced uplink beam selection protocol but also to select a particular subset of UE beams. This advantage is increased using the above guidance for defining the subsets, namely one has multiple orthogonal beams with a large beam space to support robust beam selection. Additionally, triggering signalling for sending U-BRS can be done on a group basis in one subframe so as to limit impact of the U-BRS transmissions on the data transmissions made by other UEs. And new scrambling IDs such as uplink beam quality measurement scrambling IDs can be used for the above group triggering signalling.

Figure 5A:
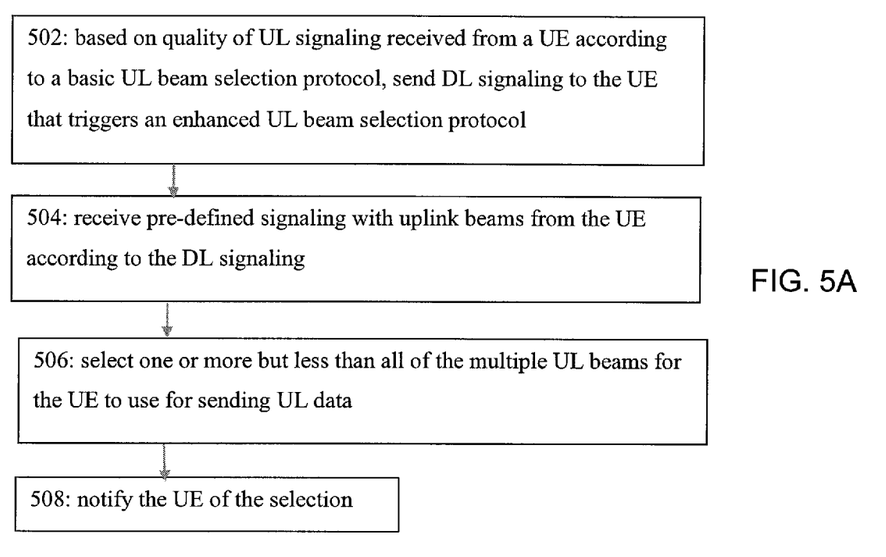
FIGS. 5A-B are process flow diagrams summarizing certain aspects of the invention from the perspective of a network radio access node and of a user equipment, respectively.

FIG. 5A is a flow diagram from the perspective of the network, more particularly from the perspective of the network radio access node such as the base station in the above examples, that summarizes some of the above features for how the network makes its uplink beam selection based on a triggered U-BRS.

Block 502 mentions a basic uplink (UL) beam selection protocol, for which an example is shown at FIG. 3 but not repeated again at FIG. 5A. Briefly, according to the FIG. 3 example of a reciprocity type of basic beam selection protocol 310, the base station transmits downlink a beam specific reference signal (such as for instance a beam specific discovery signal) for the UE's measurement on the downlink with transmit and receive beamforming. The base station then selects a transmit beam for itself and a receive beam for the UE and notifies the beam selection results. If this notification is explicit one way to do so is for the base station to directly indicate to the UE the transmit beam index and the receive beam index. If this notification is implicit one way to do so is to indicate the selected link index to the UE, where the UE used that link index when reporting its measurement results so there is no ambiguity between the base station and UE.

Whether the basic uplink beam selection is reciprocity or otherwise, block 502 reflects that at some point, based on quality of uplink signaling the network receives from the UE, the network sends downlink (DL) signaling to the UE that triggers an enhanced UL beam selection protocol. This uplink signaling at block 502 is received by the network on the uplink beam that was selected by the basic uplink beam selection protocol, which block 502 specifies as being received according to the basic UL beam selection protocol.

The downlink signaling of block 502 is the triggering signaling mentioned above, which in some embodiments may also select a predefined subset of UE beams. The base station can trigger the uplink beam selection reference signal in some embodiments with common dynamic signalling based on some criteria, such as the example comparisons above of uplink quality to some threshold or to some other candidate uplink beam. For the case of common dynamic signalling, this common triggering signalling is shared by many UEs. The mechanism for group signalling can be considered somewhat similar to signalling a group transmit power controls, but in one embodiment the common dynamic signalling for triggering the UEs to send U-BRS is in downlink control format DCI3 or DCI3A but with different scrambling IDs. To distinguish from other scrambling IDs these can be considered as uplink beam quality measurement scrambling ID (UBQM_SCID), and each UE is allocated one so they can blindly decode the DCI3/3A and any UE able to decode it with their assigned UBQM_SCID means this UE is triggered to send U-BRS. The actual triggering bits can be a single bit, or more than one bit that also selects a beam subset as in the above examples.

Further at FIG. 5A the base station at block 504 receive pre-defined signaling with uplink beams from the UE according to the DL signaling. In the above examples the pre-defined signaling is the U-BRS, which is sent on the uplink beams according to the triggering bits (where the single-bit embodiment selects all of the UE's possible beams). At block 506 the base station selects an uplink beam, or more broadly, one or more of the uplink beams it received at block 504, and this selection is based on measurement results it obtains from measuring and evaluating the pre-defined signalling it receives at block 504. Finally at block 508 the base station notifies UE of its beam selection results such as by adding this new information to any of a variety of conventional control signalling messages.

Figure 5B:
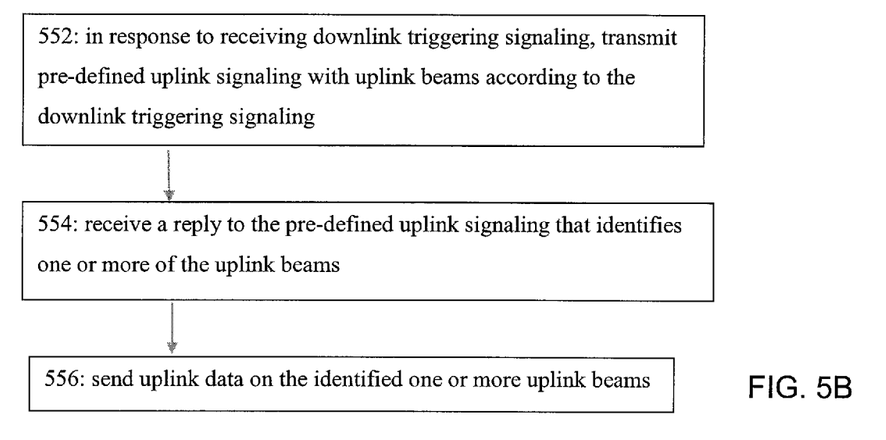

FIG. 5B is a flow diagram of certain aspects of the invention from the perspective of the UE that summarizes some of the above features for how the UE performs its portion of the enhanced uplink beam selection protocol 320. Not shown in FIG. 5B is the basic uplink beam selection protocol 310 that may in some deployments of these teachings be used immediately prior to this enhanced protocol 320. For the reciprocity-based types of basic protocols the UE would receive a downlink beam specific reference signal and make measurements of it, then UE report the beam index if the beam selection is made at UE's side else report its measurement results such as RSRP/RSRQ if the beam selection is made at the network side. Each beam measurement result has an index and is linked with one transmit beam and one receive beam. If there is no triggering of the enhanced protocol 320 (or prior to any such triggering), the UE will then make its uplink transmission based on the uplink beam that is selected by reciprocity. This means the UE's downlink receive beam is used as the UE's uplink transmit beam.

Whether or not such a basic protocol is used, FIG. 5B begins at block 552 with the downlink triggering signalling for the enhanced uplink beam selection protocol; in response to receiving such triggering signalling the UE transmits pre-defined uplink signaling with uplink beams according to the downlink triggering signaling. If the triggering signaling is only one bit and triggers the UE, the trigger is to transmit on all the UE's uplink beams and so those are the multiple uplink beams according to the downlink triggering signaling. If instead the triggering signaling selects a table index that identifies a beam subset as detailed above, then the beams in that identified subset constitute the multiple uplink beams. Regardless, it is only on those beams associated with the downlink triggering signaling on which the UE transmits, and in the above examples the pre-defined signaling that it transmits on those beams is the U-BRS. This is to assist the network with its selection of uplink beam for the UE.

In one embodiment the UE transmits its uplink beam selection reference signal at block 552 when it detects common triggering signalling, which it can decode using the scrambling code detailed above. Due to a processing delay at the UE the uplink transmission of the U-BRS on the multiple uplink beams can begin after several subframes elapse after the UE receives the triggering signalling, for example four subframes.

The UE at block 554 receives a reply to that pre-defined signalling of block 552, and that reply identifies one or more of the uplink beams that were used in block 552 for the pre-defined signalling. Finally at block 556 the UE sends uplink data according to network's uplink beam selection results, which identified the beam or beams at block 554.

Among the technical effects of these teachings the uplink beam selection mechanism described herein is fast and accurate, the beam switching mechanism is robust, and it is anticipated to improve transmission reliability and system capacity by means of selecting a more suitable uplink beam than would be done by reciprocity based selection methods. The signalling overhead to achieve these advantages is seen to be easily absorbable within the more efficient link budget.

Each of FIGS. 5A-B themselves can be considered as an algorithm, and more generally represents steps of a method, and/or certain code segments of software stored on a computer readable memory or memory device that embody the respective FIG. 5A-B algorithm for implementing these teachings from the perspective of that respective device (base station or similar radio network access node, or UE). In this regard the invention may be embodied as a non-transitory program storage device readable by a machine such as for example one or more processors of a radio network access node or UE, where the storage device tangibly embodies a program of instructions executable by the machine for performing operations such as those shown at FIGS. 5A-B and detailed above.

Figure 6:
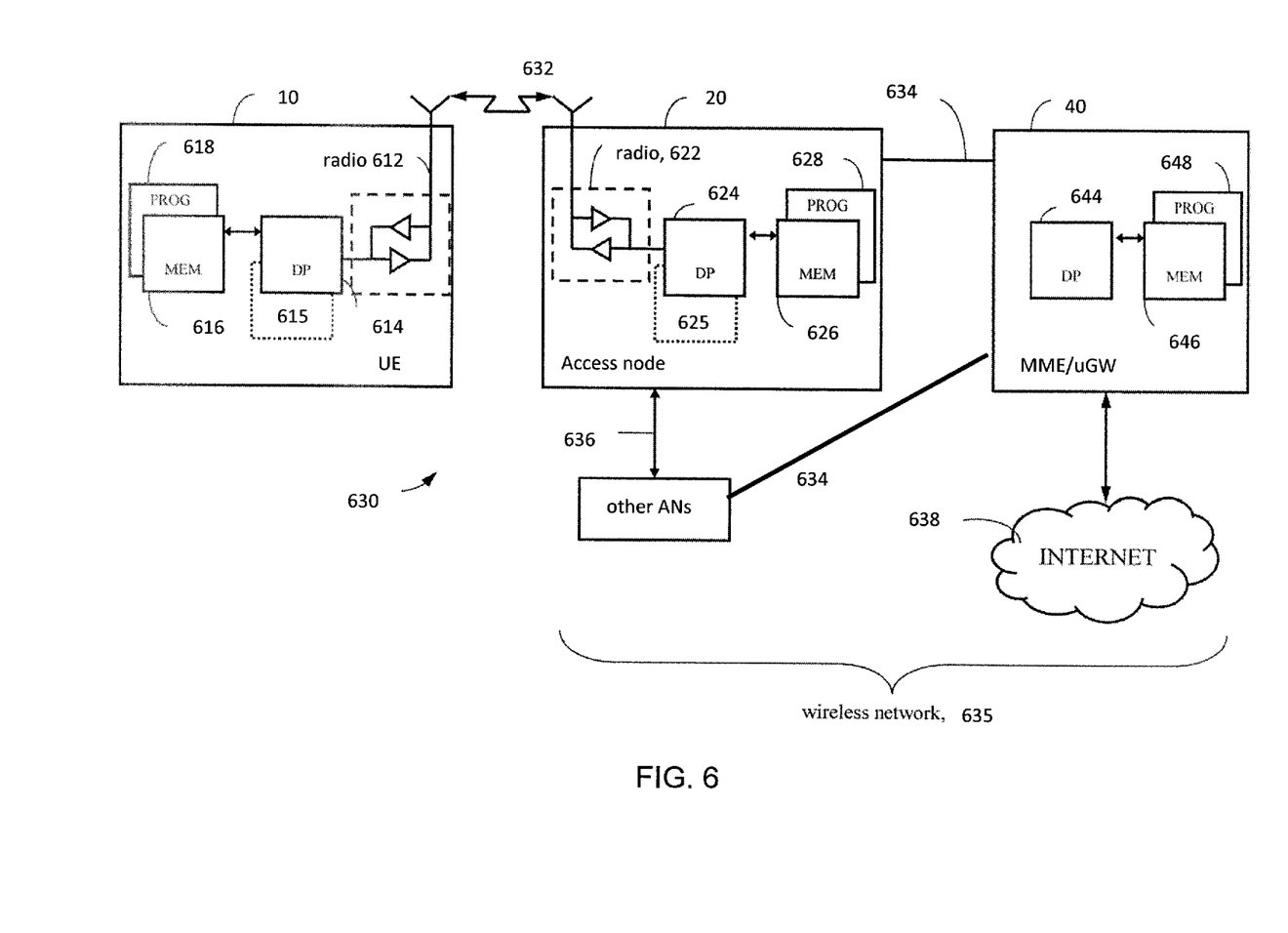
FIG. 6 is a diagram illustrating some components of a radio network access node and a UE, each of which are suitable for practicing various aspects of the invention.

FIG. 6 is a high level diagram illustrating some relevant components of various communication entities that may implement various portions of these teachings, including a base station identified generally as a radio network access node 20, a mobility management entity (MME) which may also be co-located with a user-plane gateway (uGW) 40, and a user equipment (UE) 10. In the wireless system 630 of FIG. 6 a communications network 635 is adapted for communication over a wireless link 632 with an apparatus, such as a mobile communication device which may be referred to as a UE 10, via a radio network access node 20. The network 635 may include a MME/Serving-GW 40 that provides connectivity with other and/or broader networks such as a publicly switched telephone network and/or a data communications network (e.g., the internet 638).

The UE 10 includes a controller, such as a computer or a data processor (DP) 614 (or multiple ones of them), a computer-readable memory medium embodied as a memory (MEM) 616 (or more generally a non-transitory program storage device) that stores a program of computer instructions (PROG) 618, and a suitable wireless interface, such as radio frequency (RF) transceiver or more generically a radio 612, for bidirectional wireless communications with the radio network access node 20 via one or more antennas. In general terms the UE 10 can be considered a machine that reads the MEM/non-transitory program storage device and that executes the computer program code or executable program of instructions stored thereon. While each entity of FIG. 6 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments, cellular telephones, smartphones, wireless terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The radio network access node 20 also includes a controller, such as a computer or a data processor (DP) 624 (or multiple ones of them), a computer-readable memory medium embodied as a memory (MEM) 626 that stores a program of computer instructions (PROG) 628, and a suitable wireless interface, such as a RF transceiver or radio 622, for communication with the UE 10 via one or more antennas. The radio network access node 20 is coupled via a data/control path 634 to the MME 40. The path 634 may be implemented as an Si interface. The radio network access node 20 may also be coupled to other radio network access nodes via data/control path 636, which may be implemented as an X5 interface.

The MME 640 includes a controller, such as a computer or a data processor (DP) 644 (or multiple ones of them), a computer-readable memory medium embodied as a memory (MEM) 646 that stores a program of computer instructions (PROG) 648.

At least one of the PROGs 618, 628 is assumed to include program instructions that, when executed by the associated one or more DPs, enable the device to operate in accordance with exemplary embodiments of this invention. That is, various exemplary embodiments of this invention may be implemented at least in part by computer software executable by the DP 614 of the UE 10; and/or by the DP 624 of the radio network access node 20; and/or by hardware, or by a combination of software and hardware (and firmware).

For the purposes of describing various exemplary embodiments in accordance with this invention the UE 10 and the radio network access node 20 may also include dedicated processors 615 and 625 respectively.

The computer readable MEMs 616, 626 and 646 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 614, 624 and 644 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 612 and 622) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

Below are some acronyms used herein:
BS Base Station (also eNB for enhanced nodeB)
DCI Dynamic Control Information
DL Downlink
CSI Channel State Information
MME Mobility Management Entity
m-MIMO Massive Multiple-Input Multiple Output
mmWave Millimeter wave
RRC Radio Resource Control
RS Reference signal
RSRP Reference Signal Received Power
RSRQ Reference Signal Received Quality
SINR Signal-to-Interference and Noise Ratio
TP Transmission Point
UE User Equipment
uGW user-plane gateway
U-BRS Uplink Beam Reference Signal
UL Uplink

What is claimed is:

1. An apparatus comprising:
   at least one processor; and
   at least one non-transitory memory storing instructions that, when executed by the at least one processor, cause the apparatus at least to:
   in response to receiving downlink triggering signaling from a base station, transmit uplink signaling with a set of at least one uplink resource indicated by triggering bits of the downlink triggering signaling, wherein the triggering bits of the downlink triggering signaling comprise two bits, and wherein a value of the triggering bits being different from zero indicates to the apparatus to transmit the uplink signaling with the set of at least one uplink resource defined with the value of the triggering bits, and the value of the triggering bits being zero indicates to the apparatus to not transmit the uplink signaling with the set of at least one uplink resource;
   receive a reply to the uplink signaling, wherein the reply identifies one or more of the at least one uplink resource; and
   send uplink data on the identified one or more of the at least one uplink resource.

2. The apparatus of claim 1, wherein the downlink triggering signaling is received after the apparatus transmits uplink data according to a basic uplink beam selection protocol that comprises reciprocity wherein a user equipment beam for uplink data is selected based on a network beam for downlink data.

3. The apparatus of claim 1, wherein the downlink triggering signaling indicates one or more subsets of user equipment beams from among at least two subsets of all possible user equipment beams for uplink data.

4. The apparatus of claim 3, wherein:
   at least one of the subsets defines multiple orthogonal beams; and
   at least one other of the subsets defines multiple spatially adjacent beams.

5. The apparatus of claim 1, wherein the apparatus is a user equipment, and the downlink triggering signaling is scrambled with a scrambling identity that is assigned to the user equipment.

6. The apparatus of claim 1, wherein the uplink signaling comprises an uplink beam reference signal.

7. The apparatus of claim 1, wherein the uplink signaling is sent in a subframe and multiplexed with uplink signaling from multiple other user equipments that are similarly triggered to send respective uplink signaling.

8. The apparatus of claim 1, wherein the apparatus is a user equipment operating with a 5G mmWave radio access technology.

9. The apparatus of claim 1, wherein the at least one uplink resource comprises at least one uplink beam.

10. A method comprising:
    in response to receiving downlink triggering signaling from a base station, transmitting uplink signaling with a set of at least one uplink resource indicated by triggering bits of the downlink triggering signaling, wherein the triggering bits of the downlink triggering signaling comprise two bits, and wherein a value of the triggering bits being different from zero indicates to transmit the uplink signaling with the set of at least one uplink resource defined with the value of the triggering bits, and the value of the triggering bits being zero indicates to not transmit the uplink signaling with the set of at least one uplink resource;
    receiving a reply to the uplink signaling, wherein the reply identifies one or more of the at least one uplink resource; and
    sending uplink data on the identified one or more of the at least one uplink resource.

11. The method of claim 10, wherein the uplink signaling comprises an uplink beam reference signal.

12. The method of claim 10, wherein the uplink signaling is sent in a subframe and multiplexed with uplink signaling from multiple other user equipments that are similarly triggered to send respective uplink signaling.

13. The method of claim 10, wherein the method is performed by a user equipment operating with a 5G mmWave radio access technology.

14. An apparatus comprising:
- at least one processor; and
- at least one non-transitory memory storing instructions that, when executed by the at least one processor, cause the apparatus at least to:
- transmit downlink triggering signaling to a user equipment, the downlink triggering signaling indicating a set of at least one uplink resource;
- receive uplink signaling with the set of at least one uplink resource indicated by triggering bits of the downlink triggering signaling, wherein the triggering bits of the downlink triggering signaling comprise two bits, and wherein a value of the triggering bits being different from zero indicates to the user equipment to transmit the uplink signaling with the set of at least one uplink resource defined with the value of the triggering bits, and the value of the triggering bits being zero indicates to the user equipment to not transmit the uplink signaling with the set of at least one uplink resource;
- transmit a reply to the uplink signaling, wherein the reply identifies one or more of the at least one uplink resource for the user equipment to use for sending uplink data; and
- receive the uplink data on the identified one or more of the at least one uplink resource.

15. The apparatus of claim 14, wherein the downlink triggering signaling is transmitted after the apparatus receives uplink data according to a basic uplink beam selection protocol that comprises reciprocity wherein a user equipment beam for uplink data is selected based on an apparatus beam for downlink data.

16. The apparatus of claim 14, wherein the downlink triggering signaling indicates one or more subsets of user equipment beams from among at least two subsets of all possible user equipment beams for uplink data.

17. The apparatus of claim 16, wherein:
- at least one of the subsets defines multiple orthogonal beams; and
- at least one other of the subsets defines multiple spatially adjacent beams.

18. The apparatus of claim 14, wherein the downlink triggering signaling is scrambled with a scrambling identity to enable the user equipment to blind decode the downlink signaling using the scrambling identity.

19. The apparatus of claim 14, wherein the signaling comprises an uplink beam reference signal.

20. The apparatus of claim 14, wherein the uplink signaling from the user equipment is multiplexed with uplink signaling from multiple other user equipments that are similarly triggered to send respective uplink signaling in a subframe.

21. The apparatus of claim 14, wherein the apparatus is a network radio access node or components thereof operating with a 5G mmWave radio access technology.

22. The apparatus of claim 14, wherein the at least one uplink resource comprises at least one uplink beam.

* * * * *